Patented Jan. 22, 1952

2,583,425

UNITED STATES PATENT OFFICE 2,583,425

FUNGICIDAL COMPOSITIONS CONTAINING CHLORINATED ISOPHORONE

Roger S. Hawley, Linden, N. J., assignor to Standard Oil Development Company, a corporation of Delaware No Drawing. Application December 17, 1949, Serial No. 133,657

6 Claims. (Cl. 167—30)

This invention relates to new and useful improvements in parasiticidal preparations and more particularly to improved fungicides. This invention also relates to methods of protecting organic material subject to attack by low orders of organisms.

It has now been found that chlorinated isophorones are extremely effective for checking the growth of fungi. These compounds may thus be used as novel ingredients of parasiticidal compositions.

Chlorinated isophorones wherein the isophorone is chlorinated to a range of from 47-67 wt. per cent are especially effective. This chlorination range corresponds to a chlorine atom range of 3-7 atoms per molecule of isophorone. The chlorination of isophorone to this range results in substitution of the chlorine atoms for hydrogen atoms rather than addition at the double bond. This latter fact is borne out from titrations performed of the hydrochloric acid evolved during the course of the reaction.

It is especially surprising to find that the chlorinated isophorones of this invention are fungicidal for several reasons.

Horsfall in "Fungicides and Their Action," page 151, points out that chlorine enhances the fungicidal properties of compounds that already possess those properties but chlorine does not impart toxicity to compounds that are not fungicidal. Isophorone itself is completely inactive as a fungicide, yet the chlorinated products are extremely potent fungicides.

In addition, Horsfall, on page 145, indicates that higher molecular weight monocarbonyl compounds, i. e., those above formaldehyde, are very weak fungicides, apparently because of the diminution of the effect of the carbonyl group with increasing carbon atom chain length. It is for this reason that chlorinated cyclic carbonyl compounds used for fungicidal purposes have been of the diketone type, i. e., possessed of two carbonyl groups. On the other hand, isphorone, which has only one carbonyl group and has the following formula:

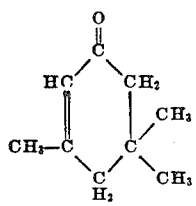

on chlorination exhibits marked fungicidal activity.

The compounds of this invention may be prepared by the direct chlorination of isophorone. It is preferable to carry out the chlorination in the presence of ultraviolet light to catalyze the reaction. No solvent or carrier is needed in the process and the temperature is kept below the boiling point of isophorone (215° C.).

The following examples are given to illustrate this invention and include both the preparation of chlorinated isophorone and test results obtained on the active compounds employed as fungicides.

EXAMPLE I

*Preparation of chlorinated isophorones*

100 gms. of distilled isophorone was placed in a 500 cc. three-neck flask fitted with a stirrer, a condenser, a gas inlet tube and a thermometer. Chlorine was bubbled in while the material was being stirred, and the temperature was kept below 150° C. Ultraviolet light was not used to catalyze the reaction until after the material contained 47.34% chlorine by weight. Chlorination was continued then with the ultraviolet light until the material contained 66% $Cl_2$ by weight. Hydrogen chloride remaining in the product was removed by stripping with nitrogen.

EXAMPLE II

The chlorinated compounds prepared in Example I were made free of hydrogen chloride and tested for fungicidal activity.

|  | Fungicidal Inhibiting Concentration, Per Cent | |
|---|---|---|
|  | *Alterneria solani* | *Sclerotinia fructicola* |
| Chlorinated isophorone, 47.3% Cl | 0.001 | 0.001 |
| Chlorinated isophorone, 57.6% Cl | 0.001 | 0.001 |
| Chlorinated isophorone, 62.7% Cl | 0.0001 | 0.0001 |
| Chlorinated isophorone, 66.2% Cl | 0.0001 | 0.0001 |
| Bordeaux_____per cent Cu | 0.001 | 0.001 |

The slide germination technique for fungicidal testing was carried out as described by Wellman and McCallan (Contributions of Boyce Thompson Institute, vol. 3, No. 3, pages 171-176) and is listed as concentration of test compound in per cent to give an LD-50.

These figures indicate that the compounds of this invention are at least as good as, and in several cases better than, Bordeaux mixture.

The compounds of this invention may thus be applied to parent materials to retard or prevent fungus growth and mildew formation. Since they are exceptionally nonphytotoxic, they may be applied safely to a wide variety of plants. Some of the additional parent materials to which they may be applied for protective purposes are leather, wood, fur, wool, coated fabrics, and other substances.

The compounds of this invention which in most cases are viscous amber liquids, are best distributed in the form of sprays such as in aqueous dispersions or dust compositions of the active ingredient with a powdered clay.

Since the compounds of this invention are insoluble in water, it is preferable to use them admixed with wetting or emulsifying agents so as to be able to secure aqueous emulsions and consequent uniformity of dispersion in the resulting colloidal system. The use of these wetting agents also increases the spreading action of the spray by decreasing the surface tension of the liquid carrier. This results in the securing of better contact of the spray with the surface being treated, and consequently brings the active ingredient into intimate contact with the parasite life. The concentration of active ingredient in the aqueous emulsions varies with the insect pests to be treated. In general, the aqueous emulsion contains about 5% active ingredient, and 1% wetting agent by weight. Thus, a typical emulsion concentrate formulation consists of 83% chlorinated isphorone and 17% petroleum sulfonate of about $C_{10}$–$C_{20}$ length by weight. This mixture can then be diluted with about 94 parts of water to 6 parts of concentrate.

The active compounds of this invention may also desirably be made up in solid compositions. A dust composition containing about 5% active ingredients is made up by admixing the active compounds with clays such as fuller's earth, china clay, kaolin, or bentonite. Solid wettable powders for aqueous dispersion containing about 25%–50% active ingredient, 50%–75% clay, and about 1% wetting agent. Clay itself also acts as a spreading agent.

The term "dispersing agent" is consequently used hereafter to connote generically, the various "emulsifying agents," "wetting agents" and "spreading agents" including clays that are adapted to be admixed with the active compounds of this invention in order to secure better wetting and spreading of the sprays of the active ingredients in liquid vehicles in which they are insoluble. (See Frear—"Chemistry of Insecticides, Fungicides, and Herbicides," second edition, page 280.)

Among the water-soluble wetting agents that can be used are the sulfates of long-chain alcohols such as dodecanol up to octadecanol, sulfonated amide and ester derivaties, sulfonated aromatic and mixed alkyl-aryl sulfonate derivatives, esters of fatty acids such as the ricinoleic acid ester of sorbitol, and petroleum sulfonates of $C_{10}$–$C_{20}$ length. The non-ionic emulsifying agents such as the ethylene oxide condensation products of alkylated phenols may also be used.

Solvents for the compounds of this invention may be utilized as auxiliary agents if desired. Among the solvents for the compounds of this invention are benzene, heptane, carbon tetrachloride, dioxane, acetone, and ethyl alcohol.

The compounds of this invention may also be admixed with carriers that are themselves active, such as other parasiticides, hormones, herbicides, fertilizers, and wetting agents. Stomach and contact insecticides such as the arsenates, fluorides, rotenone, and the various fish poisons and organic insecticides, such as di(p-)chlorophenyl-trichloroethane, benzene-hexachloride, and similar products may also be advantageously added. Mixtures of the active compounds of this invention may also be employed.

It is to be understood that the invention is not limited to the specific examples which have been offered merely as illustrations, since other derivatives can be prepared, and that modifications may be made without departing from the spirit of the invention.

What is claimed is:

1. A fungicidal composition comprising a chlorinated isophorone having from 47 to 67 wt. per cent of chlorine said chlorinated isophorone having been prepared by the direct chlorination of isophorone in the presence of ultraviolet light at a temperature below 215° C. admixed with a surface active dispersing agent which lowers the surface tension of water and thereby promotes aqueous colloidal emulsions of the chlorinated isophorone.

2. A fungicidal dust composition comprising a chlorinated isophorone having from 47 to 67 wt. per cent of chlorine said chlorinated isophorone having been prepared by the direct chlorination of isophorone in the presence of ultraviolet light at a temperature below 215° C. admixed with a powdered clay.

3. The composition of claim 2 in which the clay is powdered bentonite.

4. A fungicidal emulsion concentrate comprising a chlorinated isophorone having from 47 to 67 wt. per cent of chlorine said chlorinated isophorone having been prepared by the direct chlorination of isophorone in the presence of ultraviolet light at a temperature below 215° C. admixed with a petroleum sulfonate of about $C_{10}$–$C_{20}$ length, said petroleum sulfonate being present in an amount of about ⅕ by weight of the chlorinated isophorone.

5. The composition of claim 1 in which the dispersing agent is a water soluble dispersing agent selected from the group consisting of long-chain alcohol sulfates, sulfonated amide derivatives, sulfonated ester derivatives, sulfonated aromatic derivatives, sulfonated alkyl-aryl derivatives, and petroleum sulfonates of $C_{10}$ to $C_{20}$ length.

6. A fungicidal aqueous emulsion comprising in combination water, a chlorinated isophorone having from 47 to 67 wt. per cent of chlorine said chlorinated isophorone having been prepared by the direct chlorination of isophorone in the presence of ultraviolet light at a temperature below 215° C. and a minor proportion of an emulsifying agent which lowers the surface tension of water.

ROGER S. HAWLEY.

REFERENCES CITED

The following references are of record in the file of this patent:

UNITED STATES PATENTS

| Number | Name | Date |
|---|---|---|
| 2,362,564 | Ladd | Nov. 14, 1944 |
| 2,362,565 | Ladd | Nov. 14, 1944 |
| 2,362,594 | Ter Horst | Nov. 14, 1944 |
| 2,378,597 | Ter Horst | June 19, 1945 |
| 2,507,207 | Hyman | May 9, 1950 |

OTHER REFERENCES

J. Econ. Ent., vol. 39, pp. 499–503 (1946).

Beilstein: Handbuch der Organischen Chemie, vol. 7, 1st supp., p. 56, and 2d supp., p. 64.